J. E. FREER
A. J. THIBODEAU
INVENTORS

ATTORNEYS

June 26, 1962   J. E. FREER ETAL   3,041,484
DYNAMOELECTRIC MACHINE

Filed July 22, 1958   5 Sheets-Sheet 3

J.E. FREER
A.J. THIBODEAU
INVENTORS

BY
ATTORNEYS

J.E. FREER
A.J. THIBODEAU
INVENTORS

BY E.C. McRae
J.R. Faulkner
D.H. Oster
K.L. Zerschling

ATTORNEYS

June 26, 1962

J. E. FREER ETAL 3,041,484

DYNAMOELECTRIC MACHINE

Filed July 22, 1958

J.E. FREER
A.J. THIBODEAU
E. C. McRae
J. R. Faulkner
J. H. Oster
K. L. Zeroschling
INVENTORS

BY

ATTORNEYS

United States Patent Office 3,041,484
Patented June 26, 1962

3,041,484
DYNAMOELECTRIC MACHINE
John E. Freer, Ypsilanti, and Arnold J. Thibodeau, Allen Park, Mich., assignors to Ford Motor Company, Dearborn, Mich., a corporation of Delaware
Filed July 22, 1958, Ser. No. 750,152
8 Claims. (Cl. 310—68)

This invention relates to a dynamoelectric machine and more particularly to an alternator in combination with means for rectifying the alternating current output of the alternator.

Although not so limited this invention is particularly applicable to an alternator employed as a generator in an automotive electrical system. Alternators possess several very substantial advantages over the direct current type generator currently employed in the conventional passenger automobile electrical system. First and foremost of these advantages is the very considerable weight reduction possible with the use of the alternator. For example, an alternator capable of supplying the needed electrical energy for a passenger car vehicle may weigh in the neighborhood of 11 to 13 pounds, while the comparable conventional direct current generator may weigh around 23 pounds. Thus by using the alternator considerable savings can be made in the cost of the copper and other material used to construct such machines. Secondly, the rotor of the alternator may be operated at much higher peripheral velocities than the armature of the direct current generator, since rotor of the alternator conventionally carries the field of the machine which may be in the form of a permanent magnet or a peripheral field winding. Such a structure can withstand centrifugal forces of much higher magnitude than the armature windings and commutator of the direct current machine. The fact that the rotor of the alternator can be operated at much higher peripheral velocities than the armature of the direct current machine is, in part, responsible for the weight reduction previously mentioned. In addition, the conventional direct current generator employs a mechanical rectification system composed of a commutator mounted upon the rotary armature and a plurality of brushes contacting the armature. These brushes carry the output current of the generator and for this reason are quite expensive and often cause considerable difficulty by sparking due to inductive reactance of the armature winding, to wear and to dust, grit, oil and grease contaminating the brushes and commutator.

With all of the inherent advantages of the alternator over the direct current generator, its adoption as a generator for passenger car vehicles has been seriously impeded because of the lack of a suitable inexpensive means for rectifying the alternating current output of the machine. The present invention provides such a suitable rectifying means for the alternator by providing a plurality of diodes, preferably silicon diodes, grouped around one end of the alternator and disposed in heat transferring relationship with conductive members which are capable of absorbing the heat generated by the diodes and are capable of transferring this heat to the surrounding atmosphere. The conductive members serve as the terminals of the rectifying means so that connection may be made directly from these members to the external load, which may include a storage battery. In addition the invention may employ a fan connected to the rotatable shaft of the alternator to circulate cooling air over the diodes and the conductive members.

Insofar as the regulating system of the alternator is concerned, only voltage regulating components need be provided. The current regulating components of the conventional direct current generator can be eliminated since the alternator is inherently self regulating insofar as peak current is concerned. The normal cut-out contacts of the direct current system can be eliminated since the resistance in the reverse direction of the diodes employed is high enough to effectively block any reverse current.

An object of the present invention is the provision of an alternator and rectification means for said alternator which is capable of being employed as the generating unit in an automotive vehicle.

A further object is the provision of an alternator and rectifier means therefore with means for cooling said rectification means.

Still another object of the present invention is the provision of an alternator and rectification means therefore in which the cut-out and current regulator of the conventional regulating system is eliminated.

Other objects and attendant advantages of the present inveniton will become more readily apparent as the specification is considered in connection with the accompanying drawings in which.

Figure 1:
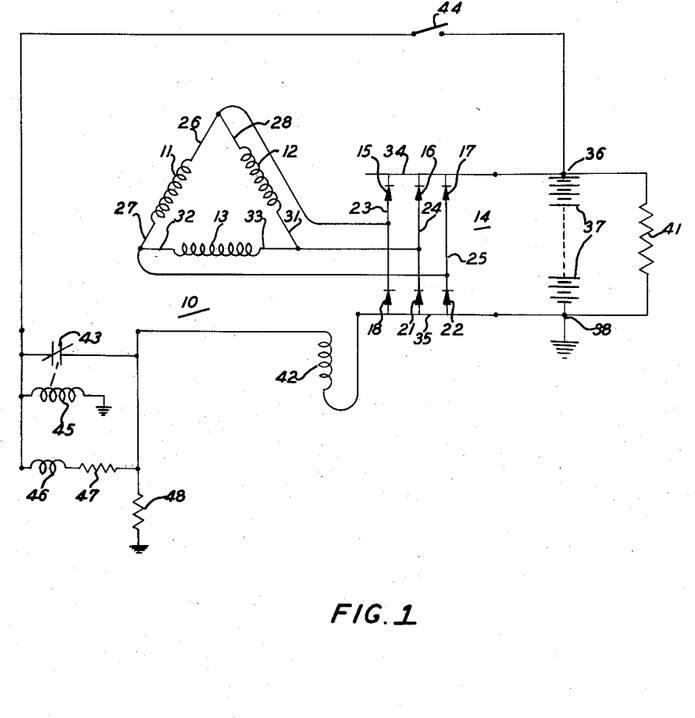
FIGURE 1 is a circuit diagram showing a typical circuit in which the invention may be employed.

Referring now to the drawings in which like reference numerals designate like parts throughout the several views thereof, there is shown in FIGURE 1 a typical electrical circuit for an automotive vehicle including the circuit diagram of the present invention in which the reference numeral 10 designates a three phase alternator including three armature windings 11, 12 and 13 which are suitably connected to feed a rectifier 14 composed of diodes 15, 16, 17, 18, 21 and 22. The diodes are arranged in two groups, each group containing 3 diodes, with the negative terminals of the first group, diodes 15, 16 and 17, being connected to the positive terminals of the second group, diodes 18, 21 and 22, by means of leads 23, 24 and 25 respectively. The armature windings 11, 12 and 13 have end leads 26 and 27, 28 and 31, and 32 and 33 respectively, which are suitably connected together so that the end lead 26 from winding 11 is connected with the end lead 28 of winding 12, the end lead 31 of winding 12 is connected with the end lead 33 of winding 13, and the end lead 32 of winding 13 is connected with the end lead 27 of the winding 11. The junction of end leads 26 and 28 is connected to the lead 23 joining diodes 15 and 18, the junction of leads 31 and 33 is connected to the lead 24 joining diodes 16 and 21, and the junction of leads 27 and 32 is connected to the lead 25 joining diodes 17 and 22.

The positive terminals of the diodes 15, 16 and 17 are electrically connected to form the positive terminal 34 of the rectifier 14, while the negative terminals of diodes 18, 21 and 22 are connected to form the negative terminal 35 of the rectifier 14. The positive terminal 36 of a storage battery 37 is connected to the positive terminal 34 of the rectifier 14, while the negative terminal 38 of the storage battery which is grounded is connected to the negative terminal 35 of the rectifier.

It is also possible to operate the system with the positive terminal 36 of the storage battery grounded. In such a case the diodes 15, 16 and 17 and the diodes 18, 21 and 22 would be reversed in polarity so that terminal 35 would become the positive terminal of the rectifier and terminal 34 would become the negative terminal of the rectifier. Connected in parallel with the storage battery 37 is a load 41 which can comprise the typical electrical equipment mounted on an automotive vehicle, including lights, cigar lighter, windshield wipers, etc., so that the load can be operated directly from the battery or from the output from the rectifier when the alternator 10 is generating current.

The field winding 42 of the alternator is grounded at one end and is connected to the positive terminal 34 of the rectifier 14 and the positive terminal 36 of the storage battery 37 through a pair of normally closed voltage regulating contacts 43 and the ignition switch 44 of the automobile. A voltage regulating shunt coil 45 is connected in parallel with the battery 37 and when the voltage across this coil rises to a selected value the normally closed contacts 43 are opened and the energy supplied to the field winding 42 is reduced, thus reducing the output of the alternator 10 in the usual manner. A bucking coil 46, regulating resistor 47, and absorbing resistor 48 are associated with the normally closed voltage regulating contacts 43 and the voltage regulating shunt coil 45. These three components function in the conventional manner in this circuit.

In the conventional automotive circuit utilizing a direct current generator, three separate and distinct sets of contacts with their regulating coils are necessary, the voltage regulating contacts, the current regulating contacts and the cutout contacts which prevent the battery from feeding current to the generator at idle or during times when the ignition switch is turned on but the automobile engine is not operating. By using diodes which have a high resistance to reverse current, such as silicon diodes, back current from the battery to the armature windings is effectively blocked so there is no longer any need for the conventional cut-out contacts. Also, the need for current regulating contacts has been eliminated since the alternator is inherently self regulating insofar as peak current is concerned. Thus by using the alternator in combination with diodes which have a high resistance to reverse current, the only control needed is a voltage control, and two of the three conventional controls can be eliminated.

Figures 2, 4, 5:
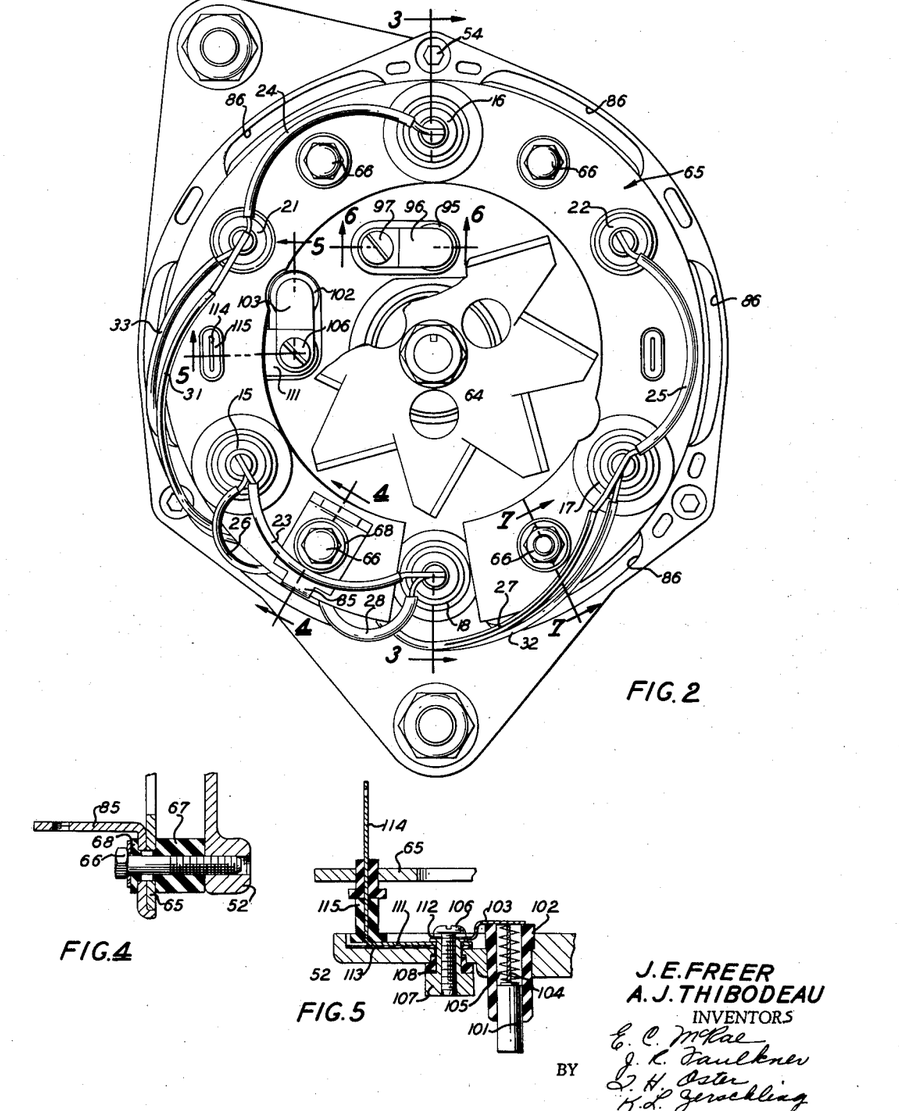
FIGURE 2 is an end view of one embodiment of the present invention with the end cover removed.
FIGURE 4 is a sectional view taken along the lines 4—4 of FIGURE 2.
FIGURE 5 is a sectional view taken along the lines 5—5 of FIGURE 2.
Figure 3:
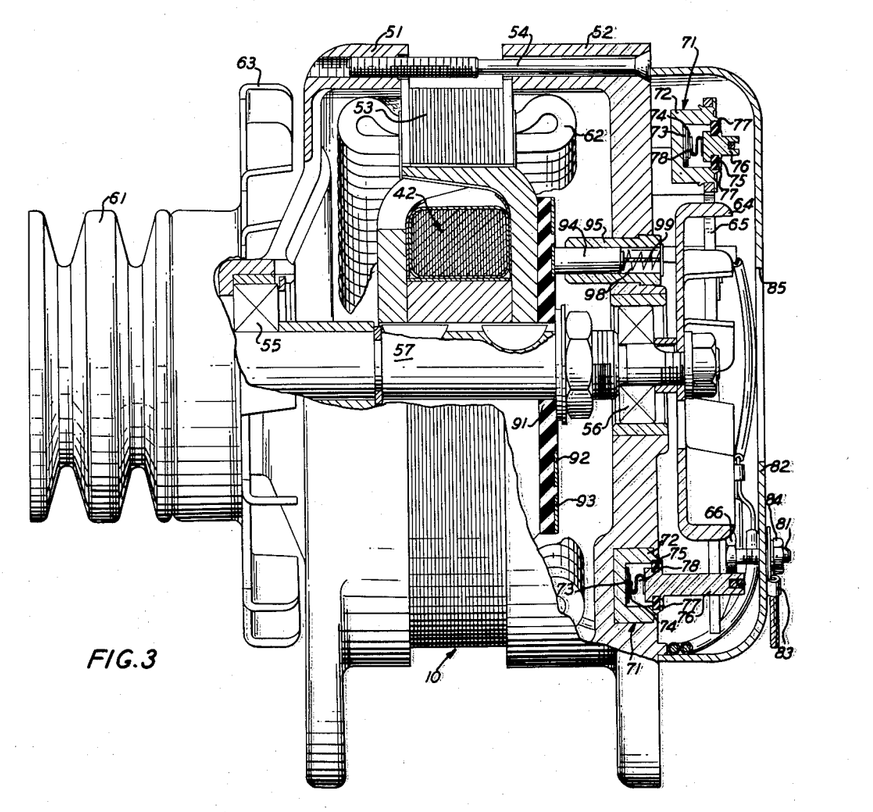
FIGURE 3 is an elevational view partially in section of the alternator shown in FIGURE 2.

Referring now to FIGURES 2 and 3, there is shown one embodiment of the alternator 10 in combination with the rectifying means 14. The alternator 10 includes a frame having two sections 51 and 52 which are forced into abutting relationship with the sides of the armature core 53 by means of screws 54. Mounted on suitable bearings 55 and 56 in the frame is a rotatable shaft 57 carrying the field winding 42 and adapted to be driven by a suitable prime mover by the pulleys 61. Mounted in the frame and around the armature core 53 in cooperating relationship with the field winding 42 are armature windings generally designated by the numeral 62 and which comprise the three armature windings 11, 12 and 13 shown schematically in FIGURE 1. The rotatable shaft 57 may also have mounted thereon adjacent the pulley 61, a fan 63 for circulating cooling air through the armature windings, and on the other end thereof adjacent the bearing 56 another fan 64 for circulating cooling air over the rectifier diodes and their supporting structure.

Imbedded in the frame member 52 around the periphery of the fan 64 are one group of the diodes of the rectifier 14, for example, diodes 18, 21 and 22. The other group of diodes 15, 16 and 17 are also mounted about the periphery of the frame by means of a conductive member 65, preferably annular in configuration and mounted in spaced relation from the end of the frame 52 by means of bolts 66. By reference to FIGURES 4 and 7 it can be seen that an insulating bushing 67 is positioned between the frame member 52 and the conductive member 65 and an insulating washer 68 is positioned between the head of the bolt 66 and the conductive member 65 to electrically insulate the frame member 52 from the conductive member 65.

Referring now to FIGURE 3, each of the diode assemblies indicated generally at 71 comprises a cup 72 of conductive material, for example, aluminum, into which is fitted a disc or slug of metal 73, for example copper, in electrical contact with the bottom of the cup. Positioned on the disc or slug 73 is the diode proper 74 which may be of any known type, however, silicon diodes are preferred as they operate at higher temperatures than other known diodes and the reverse current through them is substantially negligible. The cup 72 may have a recessed annular portion to receive a sealing washer 75 which also fits over a reduced portion of a terminal pin 76. The cavity in the cup may be suitably sealed by crimping a small amount of the metal of the cup and the terminal as shown at 77. An S-shaped spring 78 constructed from a spring metal ribbon is positioned between the diode 74 and the terminal 76 to hold the diode in position and also to furnish a means for making electrical contact with the terminal 76. Thus each diode assembly has two terminals, one terminal comprising the metal cup 72 and the other terminal comprising the pin 76.

It is preferred to place the diodes 74 in the assembly so that the cup 72 forms the negative terminal of the diode of each of the diode assemblies which are imbedded in the frame member 52 and so that the positive terminal of these diodes comprises the terminal pins 76. The cups 72 of each of the diode assemblies embedded in the frame is in electrical and heat transferring contact with the frame so that the frame itself forms the negative terminal of the rectifier 14. As to the diode assemblies mounted on the conductive member 65 the diodes 74 are reversed in position so that the cups 74 form the positive terminals of the diode assemblies and the terminal pins 76 form the negative terminals of the diode assemblies. The cups 72 of each of the diode assemblies 71 mounted on the conductive member 65 are press fitted into suitable holes formed in the conductive member so that the cups are in both electrical and heat transferring contact with the conductive member 65. Thus the conductive member 65 forms the positive terminal of the rectifier 14. Referring back to FIGURE 1, the diodes 15, 16 and 17 are mounted in the conductive member 65 while the diodes 18, 21 and 22 are embedded in the frame member 52.

Figure 7:
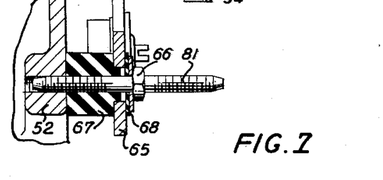
FIGURE 7 is a sectional view taken along the lines 7—7 of FIGURE 2.

It can be appreciated, therefore, that to connect the rectifier 14 to the external circuitry such as the storage battery 37 and the load 41, one need only make connection to the frame, the negative terminal of the rectifier, and the conductive member 65, the positive terminal of the rectifier. Referring to FIGURE 7 it can be seen that the bolt 66 makes contact with the frame member 52 and is electrically insulated from the conductive member 65. The bolt 66 has a threaded extension 81 which extends through the cover 82 (see FIGURE 3) and receives a lead clip 83 which makes electrical contact with the bolt by means of the nut 84, thus providing a means for connecting the frame member 52, the negative terminal of the rectifier, with the storage battery 37 and the load 41. The conductive member 65, the positive terminal of the rectifier 14 can be connected to the external circuitry by means of a terminal clip 85 (see FIGURE 4), which is in electrical contact with the conductive member 65, but is insulated from the bolt 66 and thus the frame member 52 by means of the insulating washer 68.

Referring now to FIGURE 2, it can be seen that the diode assemblies containing diodes 15, 16 and 17 are mounted in the conductive member 65, while the diode assemblies containing the diodes 18, 21 and 22 are embedded in the frame, with the terminal pins 76 of the assemblies containing diodes 21 and 22 extending through suitable apertures in the conductive member 65 and with the terminal pin of the assembly containing diode 18 extending between the ends of the annular shaped conductive member 65.

The end lead 26 from the armature winding 11 is connected to the terminal pin of the diode assembly containing diode 15 while the end lead 28 from the armature winding 12 is connected to the terminal pin of the assembly containing diode 18. The terminal pins of these two diode assemblies are connected together by a lead 23. The end leads 31 and 33 from the armature windings 12 and 13 are connected to the terminal pin of the assembly containing the diode 21 while a lead 24 connects the terminal pin of the assembly containing diode 21 with the terminal pin of the assembly containing diode 16. Similarly, the end leads 27 and 32 from the armature windings 11 and 13 are connected with the terminal pin of the assembly containing diode 17, while the terminal pins of the assemblies containing diodes 17 and 22 are connected by a lead 25. It can be readily realized that this is equivalent to the schematic of the alternator and rectifier assembly shown schematically in FIGURE 1.

Figure 6:
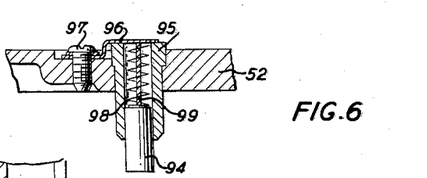
FIGURE 6 is a sectional view taken along the lines 6—6 of FIGURE 2.

Referring to FIGURE 3, the rotatable shaft 57 has a slip ring card 91 of insulating material positioned thereon closely adjacent the field winding 42. The slip ring card has a pair of concentric metallic slip rings 92 and 93 positioned thereon with the slip ring 92 connected to one end of the field winding and the slip ring 93 connected to the other end of the field winding. As can be seen by reference to FIGURE 1, one end of the field winding 42 is grounded, and this is accomplished by the structure shown in FIGURES 3 and 6. A brush 94 is contained within a holder 95 which is press fitted into the frame member 52. An end cover 96 covers the end of the holder 95 and is affixed to the frame by means of a screw 97. The brush 94 is biased against the slip ring 92 by means of a spring 98 while electrical contact between the brush and the end cover 96 is accomplished by means of a lead 99, thus grounding the slip ring 92 and one end of the field winding 42 to the frame of the alternator.

Connection is made from the external circuitry, for example, the voltage regulator shown schematically in FIGURE 1 to the slip ring 93 by means of the structure shown in FIGURE 5. Here, a brush 101 is mounted in a holder 102 made of insulating material and which is press fitted in the frame member 52. An end cover 103 fits over the brush holder, and is electrically connected to the brush 101 by means of a lead 104, while a spring 105 biases the brush against the slip ring 93. The end cover 103 is supported by the frame member 52 by means of a bolt 106 threaded into a sleeve 107. An insulating washer 108 separates the sleeve from the frame member at the lower end and suitably spaces the sleeve from the frame member so that the end cover 103, the bolt 106 and the sleeve 107 are insulated from the frame. A connector 111 is positioned under a flange 112 on the sleeve 107 so that it is in electrical contact with the sleeve and bolt 106. The connector is insulated from the frame member 52 by means of a flat insulating member 113. The connector 111 carries an extension 114 at right angles to the portion which is positioned against the flat insulating member 113. This extension protrudes through the conducting member 65 and has an insulating sleeve 115 surrounding it to insulate it from the conductive member. Connection to the external circuitry can then be made at the end of the extension 114 of the connector 111.

Referring now to FIGURES 8 through 12 there is shown another embodiment of the invention which is capable of being employed in the schematic shown in FIGURE 1. This embodiment is, in general, similar to the embodiment disclosed in FIGURES 2 through 7 with the exception of the mounting of the diode assemblies, the mounting of the brushes for the slip rings and the structural details of making electrical connection to said slip rings. As can best be seen by reference to FIGURES 9 and 10, this embodiment of the invention employs two disc shaped annular members of conductive material 121 and 122 axially spaced from the end of frame member 52. The inner member 121 carries the diode assemblies which include the diodes 18, 21 and 22, while the outer conductive member 122 carries the diode assemblies which include the diodes 15, 16 and 17. The diode assemblies are shown here in elevation but they are similar to the diode assemblies shown in cross section in FIGURE 3, and include the cup 72 of conductive material which is an electrical and heat transferring contact with both the diode proper and with the conductive members 121 and 122. Each of the cups has a flange 123 which fits on one side of the members 121 and 122. A shoulder 124 is crimped over to secure cups 72 firmly to conductive members 121 and 122. As can be seen by reference to FIGURE 9, the flanges on the cups of the diode assemblies mounted on the inner conductive member 121 are positioned near one end of the cup while the flanges on the diode assemblies mounted on the outer conductive member 122 are positioned near the other end of the cup thus permitting a large portion of each of the cups 72 to be positioned between the members 121 and 122. The diodes 18, 21 and 22 are positioned so that the cups 72 are negative terminals of the diodes and the terminal pins 76 are the positive terminals of the diodes, thus making the inner conductive member 121 the negative terminal of the rectifier 14. Conversely, the diodes 15, 16 and 17 positioned in the assemblies supported by the outer conductive member 122 are positioned so that the cups 72 are the positive terminals of the diodes and the terminal pins 76 are the negative terminals of the diodes, thus making the outer conductive member 122 the positive terminal of the rectifier 14.

Figure 10:
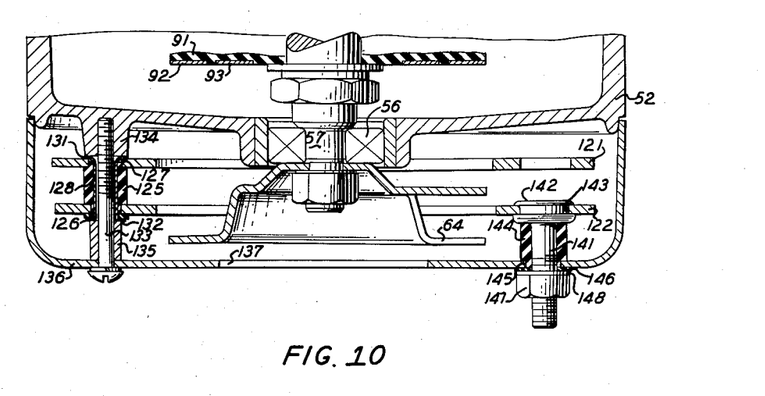
FIGURE 10 is a partial sectional view taken along the lines 10—10 of FIGURE 8.

Referring now to FIGURE 10, it can be seen that the two conductive members 121 and 122 are supported in axial spaced relationship by means of an insulating bushing 125 which has a first portion of reduced diameter 126 to receive the outer conductive member 122 and a second portion of reduced diameter 127 to receive the inner conductive member 121. The insulating bushing 125 has an inner conductive sleeve 128 positioned therein with a lower flange 131 and an upper flange 132. A screw 133 fits through the conductive sleeve and is received in an internally threaded boss 134 in the frame member 52, a spacer 135 is positioned between the end cover member 136 and the flange 132 on the conductive sleeve 128. The screw 133 thus supports the two conductive members 121 and 122 in axially spaced relationship from the end of the frame and simultaneously provides a convenient means for connecting the negative terminal of the rectifier 14, the inner conductive member 121, with the external circuitry such as the storage battery 37 and the load 41, as the screw is in electrical contact with the inner conductive member 121 and the frame member 52 and is electrically insulated from the outer conductive member 122. The two conductive members 121 and 122 may be similarly supported by the frame member 52 in axial spaced relationship by the cap screws 137, 138 and 139 (see FIGURE 8) at different points on the two members. At these points, of course, the screws need not extend through the end cover 136, and the caps of the screws may be positioned flush against the flange 132 of the conductive sleeve 128.

FIGURE 10 also shows the external connection to the outer conductive member 122, the positive terminal of the rectifier 14. This connection comprises a threaded shank 141 with an enlarged portion 142 having an annular recess 143 for receiving the outer conductive member 122. The shank 141 has an insulating sleeve 144 positioned thereover which abuts the enlarged portion 142 at one end and has a portion of reduced diameter 145 at the other end to receive the end cover 136. A suitable insulating washer 146 is positioned between a nut 147 and the end housing to insulate the threaded shank from the end housing. It can thus be appreciated that the threaded shank 141 and the nut furnish a suitable place where external circuitry, for example, the storage battery 37 and the load 41 may be connected to the positive terminal of the rectifier, outer conductive member 122, by means of a terminal clip 148.

Figures 8, 11, 12:
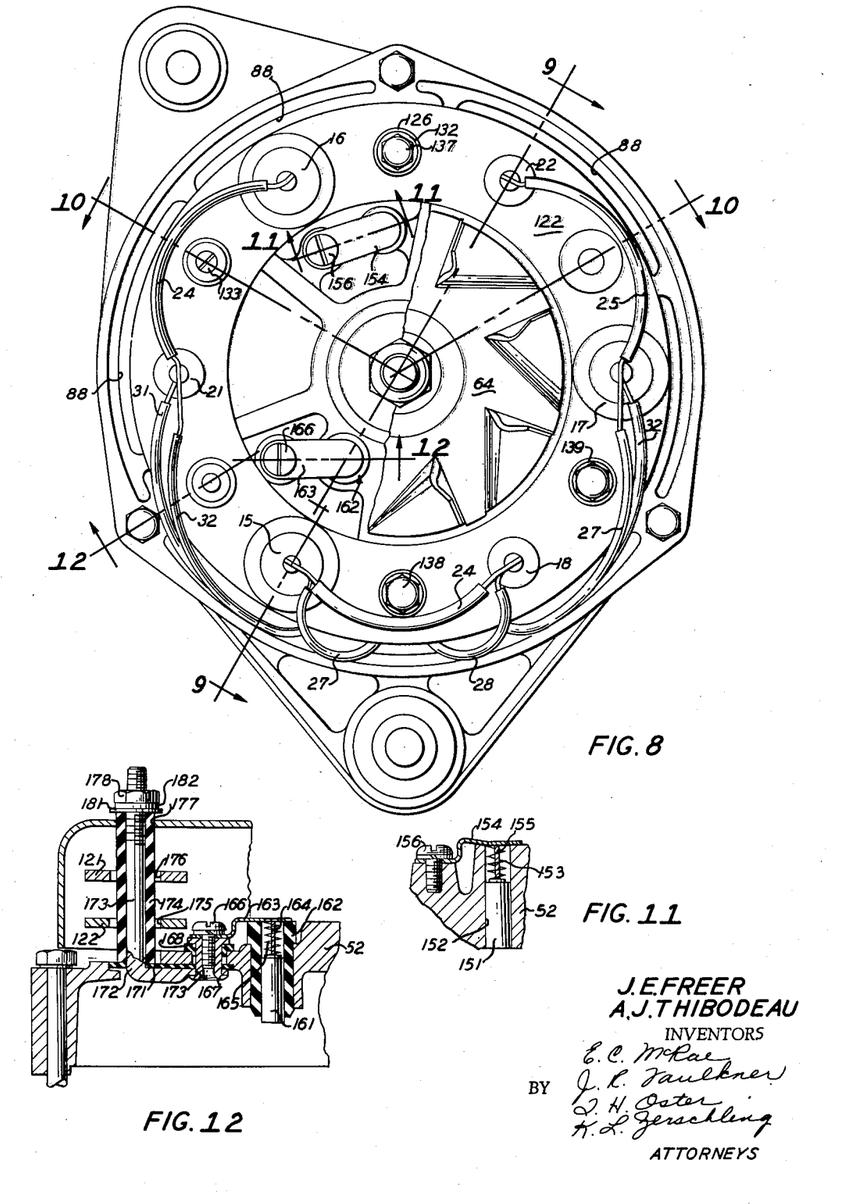
FIGURE 8 is an end view of another embodiment of the present invention with the end cover removed.
FIGURE 11 is a sectional view taken along the lines 11—11 of FIGURE 8.
FIGURE 12 is a sectional view taken along the lines 12—12 of FIGURE 8.

Referring now to FIGURE 11, there is shown a brush 151 fitted into a bore 152 in the frame member 52 which is biased against the slip ring 92 by means of a spring 153 positioned between the brush and a terminal spring 154. The lead 155 extends from the brush into contact with the terminal spring 154 which is affixed to the frame by means of a screw 156. Thus one end of the field winding 42 is grounded through the slip ring 92, the brush 151, the lead 155, the terminal spring 154 and the screw 156.

Figure 9:
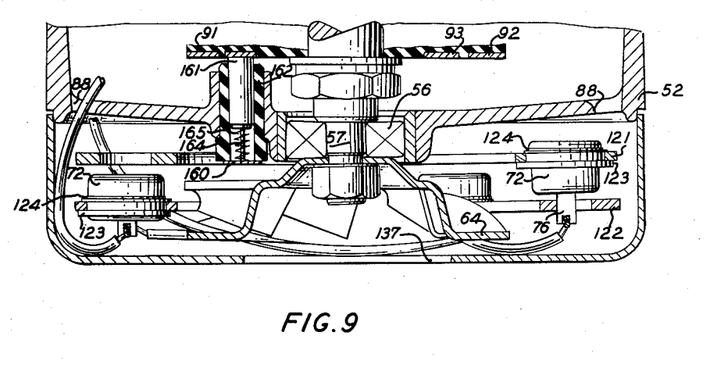
FIGURE 9 is a partial sectional view of the embodiment shown in FIGURE 8 and taken along the lines 9—9 of FIGURE 8.

The other end of the field winding 42 is connected to the external circuitry such as the voltage regulator contacts 43 by means of the structure shown in FIGURE 12. A brush 161 is positioned in an insulating sleeve 162 which is press fitted into the frame member 52. A terminal spring 163 is positioned over the end of the insulating sleeve 162 and has a lead 164 affixed thereto which makes electrical contact with the brush 161 and the terminal spring 163 to bias the brush 161 into engagement with the slip ring 93 as shown in FIGURE 9. A screw 166 receives the other end of the terminal spring 163 and this screw is threaded in a conductive sleeve 167 which is supported from the frame member by means of insulating washer 168 and a flat insulating member 171. A conductive terminal rod 172 having a central aperture 173 receives the end of the sleeve 167 which can be swaged to secure the terminal rod 172 to the sleeve 167. The terminal rod 172 is also insulated from the frame by means of the flat insulating member 171. The terminal rod 172 has an extension 173 extending substantially at right angles to that portion affixed to the sleeve 167. This extension passes through an aperture in the insulating member 171 and is encased in an insulating sleeve 174. The extension and the sleeve extend through apertures 175 and 176 in the inner conductive member 121 and the outer conductive member 122 and also through an aperture 177 in the end cover 136. The end of the extension 173 may be threaded to receive a nut 178 and carries a flange 181 which can be used to connect a clip lead 182 from external electrical components such as the voltage regulator shown in FIGURE 1. Thus the slip ring 93 may be connected to the external circuitry through the brush 161, lead 164, terminal spring 163, screw 166, metal sleeve 167 and the terminal rod 172 with its extension 173.

Comparing FIGURE 8 with FIGURE 2 it can be seen that wiring connections from the armature windings to the diode assemblies containing the diodes and the connection between the diodes to form the rectifier 14 are substantially the same.

It will be appreciated by those skilled in the art that one of the primary problems and considerations associated with the design and operation of diode rectifiers of the silicon or germanium type is the efficient removal of heat from the diodes since for a given diode the current is limited by the efficiency of heat removal. The present invention is admirably suited for the rapid removal of heat thus permitting relatively small and inexpensive diodes to rectify large amounts of current.

Referring now to the embodiment of the invention illustrated in FIGURES 2 through 7, it can be appreciated that the whole end of the frame member 52 becomes a heat sink for the diode assemblies embedded in the frame, and the cups 72 plus the whole of the conductive member 65 becomes a heat sink for the diode assemblies mounted in the conductive member 65. Thus large radiating surfaces are provided for dissipating the heat from the diodes during the operation of the alternator. In addition when the device is operating the fan 64 draws air into the end housing 82 through the central aperture located therein at 85 and circulates this air radially over the diode assemblies, the end of the frame member 52 and the conductive member 65, thus cooling these surfaces by connection. The air can pass from the end housing by means of air holes 86 positioned around the periphery of the frame (see FIGURE 2).

A combination axial inflow and radial fan may be provided as shown in the embodiment disclosed in FIGURES 8–12. In this embodiment the conductive cups 72 of each of the diode assemblies plus the conductive members 121 and 122 act as a heat sink for the diodes thus providing a very substantially radiating surface. The fan 64 draws air through the central aperture 137 in the end housing 136, and circulates it over the diode assemblies and both the inner and outer conductive members 121 and 122. The air may leave the end housing through the apertures 88 in the frame member 52 as with the embodiment shown in FIGURES 2 through 7. These apertures 88 can best be seen by reference to FIGURES 8 and 9.

Although the invention is not limited thereto, it is preferred to construct the frame members 51 and 52 of a die cast aluminum alloy, for example M–2A16, while the cups 72 of the diode assemblies 71, and the conductive members 65, 121, and 122 are also made from aluminum or an aluminum alloy. Aluminum is an excellent metal to use for this purpose since it has excellent heat and electrical conductivity characteristics as well as being light in weight which results in a considerable weight reduction.

Thus the present invention provides a practical alternator in combination with rectifier means which are cooled in a reliable and efficient manner.

It will be understood that the invention is not to be limited to the exact construction shown and described, but that various changes and modifications may be made without departing from the spirit and scope of the invention, as defined in the appended claims.

What is claimed is:

1. A dynamoelectric machine comprising a field winding, an armature winding and a rotatable shaft, one of said windings being positioned upon said shaft for rotation therewith, rectifier means comprising a plurality of diodes connected to said armature winding, a plurality of conductive cups, said diodes being positioned within said conductive cups, a fan affixed to said rotatable shaft, a first conductive means for supporting a first group of conductive cups containing said diodes in spaced relationship about the periphery of said fan, a second conductive means for supporting a second group of conductive cups containing said diodes in spaced relationship about the periphery of said fan, said first conductive means forming one terminal for said rectifier means and said second conductive means forming the other terminal for said rectifier means.

2. A dynamoelectric machine comprising, a frame, a field winding, an armature winding, and a rotatable shaft, one of said windings being positioned upon said shaft for rotation therewith, rectifier means comprising a plurality of diodes connected to said armature winding, a plurality of conductive cups, said diodes being positioned within said conductive cups, a first group of conductive cups containing said diodes being imbedded in said frame so that said frame comprises one terminal of said rectifier means, a fan positioned upon said rotatable shaft, a metal member supporting a second group of conductive cups containing said diodes in spaced relationship about the periphery of said fan, said metal member forming the other terminal of said rectifier means, said fan being operative upon rotation of said shaft to cool both groups of diodes.

3. A dynamoelectric machine comprising, a frame, a field winding, an armature winding, and a rotatable shaft, one of said windings being positioned upon said shaft for rotation therewith, rectifier means comprising a plurality of diodes connected to said armature winding, a plurality of conductive cups, said diodes being postioned within said conductve cups, a fan affixed to said rotatable shaft, a first metal member supporting a first group of conductive cups containing said diodes in spaced relationship about the periphery of said fan, said first metal member being spaced axially from one end of said frame, a second metal member supporting a second group of conductive cups containing said diodes in spaced relationship about the periphery of said fan, said second metal member being axially spaced from said first metal member, said first metal member forming one terminal for said rectifier means and said second metal member forming the other terminal for said rectifier means.

4. A dynamoelectric machine comprising a frame, a field winding, an armature winding, and a rotatable shaft, one of said windings being positioned upon said shaft, rectifier means comprising a plurality of diodes, a plurality of conductive cups, said diodes being positioned within said conductive cups, each of said diodes having a first and a second terminal, a first conductive means for supporting a first group of said diodes in spaced relationship about said shaft, said first conductive means having a plurality of apertures positioned therein, the conductive cups of said first group of diodes being positioned within said apertures and in electrical and heat transferring contact with said first conductive means, a second conductive means for supporting a second group of said diodes in spaced relationship about said shaft, said second conductive means having a plurality of apertures positioned therein, the conductive cups of said second group of diodes being positioned within said apertures and in electrical and heat transferring contact with said second conductive means, said first conductive means being connected to the first terminal of each of said diodes in said first group to form one terminal for said rectifier means, the second terminal of the diodes in said first group being connected to said armature winding, said second conductive means being connected to the second terminal of each of said diodes in said second group to form the other terminal for said rectifier means, the first terminal of the diodes of said second group being connected to said armature winding.

5. A dynamoelectric machine comprising a frame, a field winding, an armature winding, and a rotatable shaft, one of said windings being positioned upon said shaft, rectifier means comprising a plurality of diodes, a plurality of conductive cups, said diodes being positioned within said conductive cups, each of said diodes having a first and a second terminal, said frame supporting a first group of said diodes in spaced relationship about said shaft, said frame having a plurality of bores positioned therein, the conductive cups of said first group of diodes being positioned within said bores and in electrical and heat transferring contact with said frame, a conductive member supporting a second group of diodes in spaced relationship about said shaft, said conductive member having a plurality of apertures positioned therein, the conductive cups of said second group of diodes being positioned within said apertures and in electrical and heat transferring contact with said conductive member, said frame being connected to the first terminal of each of said diodes in said first group to form one terminal for said rectifier means, the second terminal in said first group being connected to said armature winding, said conductive member being connected to the second terminal of each of said diodes in said second group to form the other terminal for said rectifier means, the first terminal of the diodes of said second group being connected to said armature winding.

6. A dynamoelectric machine comprising a frame, a field winding, an armature winding, and a rotatable shaft, one of said windings being positioned upon said shaft, rectifier means comprising a plurality of diodes, a plurality of conductive cups, said diodes being positioned within said conductive cups, each of said diodes having a first and a second terminal, a first conductive member supporting a first group of said diodes in spaced relationship about said shaft, said first conductive member having a plurality of apertures positioned therein, the conductive cups of said first group of diodes being positioned within said apertures and in electrical and heat transferring contact with said first conductive member, said first conductive member being axially spaced from said frame, a second conductive member supporting a second group of said diodes in spaced relationship about the periphery of said shaft, said second conductive member having a plurality of apertures positioned therein, the conductive cups of said second group of diodes being positioned within said apertures and in electrical and heat transferring contact with said second conductive member, said second conductive member also being spaced axially from said frame, said first conductive member being connected to the first terminal of each of said diodes in said first group to form one terminal for said rectifier means, the second terminal of the diodes in said first group being connected to said armature winding, said second conducting member being connected to the second terminal of each of the diodes in said second group to form the other terminal for said rectifier means, the first terminal of the diodes in said second group being connected to said armature winding.

7. A dynamoelectric machine comprising a frame, an armature winding, rectifier means comprising a plurality of diodes connected to said armature winding, a plurality of conductive cups, said diodes being positioned within said conductive cups, a rotatable shaft supported by said frame, a fan affixed to said rotatable shaft, a first conductive means supporting a first group of conductive cups containing said diodes in spaced relationship about the periphery of said fan, a second conductive means supporting a second group of conductive cups containing said diodes in spaced relationship about the periphery of said fan, said first conductive means forming one terminal for said rectifier means and said second conductive means forming the other terminal for said rectifier means.

8. A dynamoelectric machine comprising an armature winding, rectifier means comprising a plurality of diodes, a plurality of conductive cups, each of said conductive cups containing one of said diodes, each of said diodes having a first and a second terminal, a first conductive means for supporting a first group of said diodes in spaced relationship adjacent one end of said dynamoelectric machine, said first conductive means having a plurality of apertures positioned therein, the conductive cups of said first group of diodes being positioned within said apertures and in electrical and heat transferring contact with said first conductive means, a second conductive means for supporting a second group of said diodes in spaced relationship adjacent said end of said dynamoelectric machine, said second conductive means having a plurality of apertures positioned therein, the conductive cups of said second group of diodes being positioned within said apertures and in electrical and heat transferring contact with said second conductive means, said first conductive means being connected to the first terminal of each of said diodes in said first group to form one terminal for said rectifier means, the second terminal of each of the diodes in said first group being connected to said armature winding, said second conductive means being connected to the second terminal of each of said diodes in said second group to form the other terminal for said rectifier means, the first terminal of the diodes in said second group being connected to said armature winding.

References Cited in the file of this patent

UNITED STATES PATENTS

| | | |
|---|---|---|
| 2,550,013 | Kureth | Apr. 24, 1951 |
| 2,722,652 | Brainard | Nov. 1, 1955 |
| 2,819,435 | Connell | Jan. 7, 1958 |
| 2,923,869 | Parrish | Feb. 2, 1960 |
| 2,974,263 | Akins | Mar. 7, 1961 |
| 3,001,121 | Kerr | Sept. 19, 1961 |

FOREIGN PATENTS

| | | |
|---|---|---|
| 713,886 | Great Britain | Aug. 18, 1954 |